United States Patent
Richtsmeier et al.

(10) Patent No.: US 9,329,525 B2
(45) Date of Patent: May 3, 2016

(54) TONER CONTAINER AND PRINTING DEVICE

(75) Inventors: Dean J Richtsmeier, Boise, ID (US); Robin Pierce Yergenson, Eagle, ID (US); Richard L Swantner, Rapid City, SD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/391,399

(22) PCT Filed: Jun. 5, 2012

(86) PCT No.: PCT/US2012/040914
§ 371 (c)(1),
(2), (4) Date: Oct. 9, 2014

(87) PCT Pub. No.: WO2013/184102
PCT Pub. Date: Dec. 12, 2013

(65) Prior Publication Data
US 2015/0049355 A1    Feb. 19, 2015

(51) Int. Cl.
*G06F 3/12* (2006.01)
*G03G 15/08* (2006.01)
*H04N 1/00* (2006.01)

(52) U.S. Cl.
CPC ........ *G03G 15/0865* (2013.01); *G03G 15/0875* (2013.01); *H04N 1/00557* (2013.01); *H04N 2201/0094* (2013.01)

(58) Field of Classification Search
None
See application file for complete search history.

(56) References Cited

U.S. PATENT DOCUMENTS

| 5,619,312 | A  | * | 4/1997 | Hatano et al. | 399/61 |
| 5,722,014 | A  |   | 2/1998 | Fike | |
| 5,826,132 | A  | * | 10/1998 | Damji et al. | 399/110 |
| 7,155,149 | B2 | * | 12/2006 | Fujii et al. | 399/258 |
| 7,619,205 | B2 | * | 11/2009 | Mori et al. | 250/227.11 |
| 2006/0275051 | A1 | * | 12/2006 | Daniels | 399/109 |
| 2008/0056761 | A1 | * | 3/2008 | Kawahara et al. | 399/110 |
| 2008/0254378 | A1 |   | 10/2008 | Matsumoto et al. | |
| 2011/0311277 | A1 |   | 12/2011 | Iwasaki et al. | |

FOREIGN PATENT DOCUMENTS

| EP | 1978414 | 10/2008 | |
| EP | 2196865 | 6/2010 | |
| JP | 09258545 A * | 10/1997 | G03G 15/08 |

OTHER PUBLICATIONS

CIS (CISS) for Canon Inkjet Printers Coming iP4700 CIS; http://freedomtopring.com/2010/03/29/cis-ciss-for-canon-inkjet-printers-coming-ip4700-cis/ ; Mar. 29, 2010.
Xerox Corporation, Xerox® ColorQube® 8900 Multifunction Printer; http://content.etilize.com/Manufacturer-Brochure/1022105289.pdf >; 2012, 8 pages.

* cited by examiner

*Primary Examiner* — Marivelisse Santiago Cordero
*Assistant Examiner* — Neil R McLean
(74) *Attorney, Agent, or Firm* — HP Inc. Patent Department

(57) ABSTRACT

In one example, a toner container has an interior volume defined by a body and a pair of wings extending up and out from the body.

7 Claims, 7 Drawing Sheets

TONER CONTAINER AND PRINTING DEVICE

BACKGROUND

The printing process used in many laser printers and other such electro-photographic printers involves creating a latent electrostatic image on a photoconductor and depositing toner on the surface of the photoconductor. The toner adheres to the imaged areas of the photoconductor to form a developed image that is transferred to paper or another print substrate. The toner supply is usually contained in a replaceable cartridge that sometimes also houses the photoconductor and other image development components of the printer.

DRAWINGS

The section views have been simplified in some instances to better illustrate certain features, for example by omitting some cross-hatching and background structures. The same part numbers are used to designate the same or similar parts throughout the figures.

DESCRIPTION

A new toner container has been developed to increase the toner supply capacity in some laser printers and multifunction laser printing devices (MFPs) without also increasing the size of the device. Examples of the new toner container utilize otherwise unoccupied spaces within the printer housing and, for some examples, within the scanner housing for an MFP, to expand toner supply capacity while minimizing the size of the device. In some examples, the new toner container has sufficient capacity to eliminate the need for the user to replace the original toner container. In such examples, the toner container may be configured as a non-removable component integrated into the printer or MFP structure as a bad bearing member and/or as part of the exterior.

Some examples of the new toner container facilitate the implementation of a printer use model in which printing capacity may be purchased incrementally, as desired, to help the user control printing costs. In these examples, the same toner container may be used for both fixed page count printers in which only the amount of toner needed to satisfy the fixed page count is supplied with the printer, or for variable page count printers in which the user may purchase access to additional printing capacity using toner originally supplied with the printer.

Examples of the new toner container will be described with reference to an MFP that includes a scanner and a laser printer. Examples of the new toner container, however, are not limited to MFPs or laser printers. Examples might also be implemented in other types of electro-photographic printers and MFPs. The examples shown in the figures and described below illustrate but do not limit the invention, which is defined in the Claims following this Description.

Figure 1:
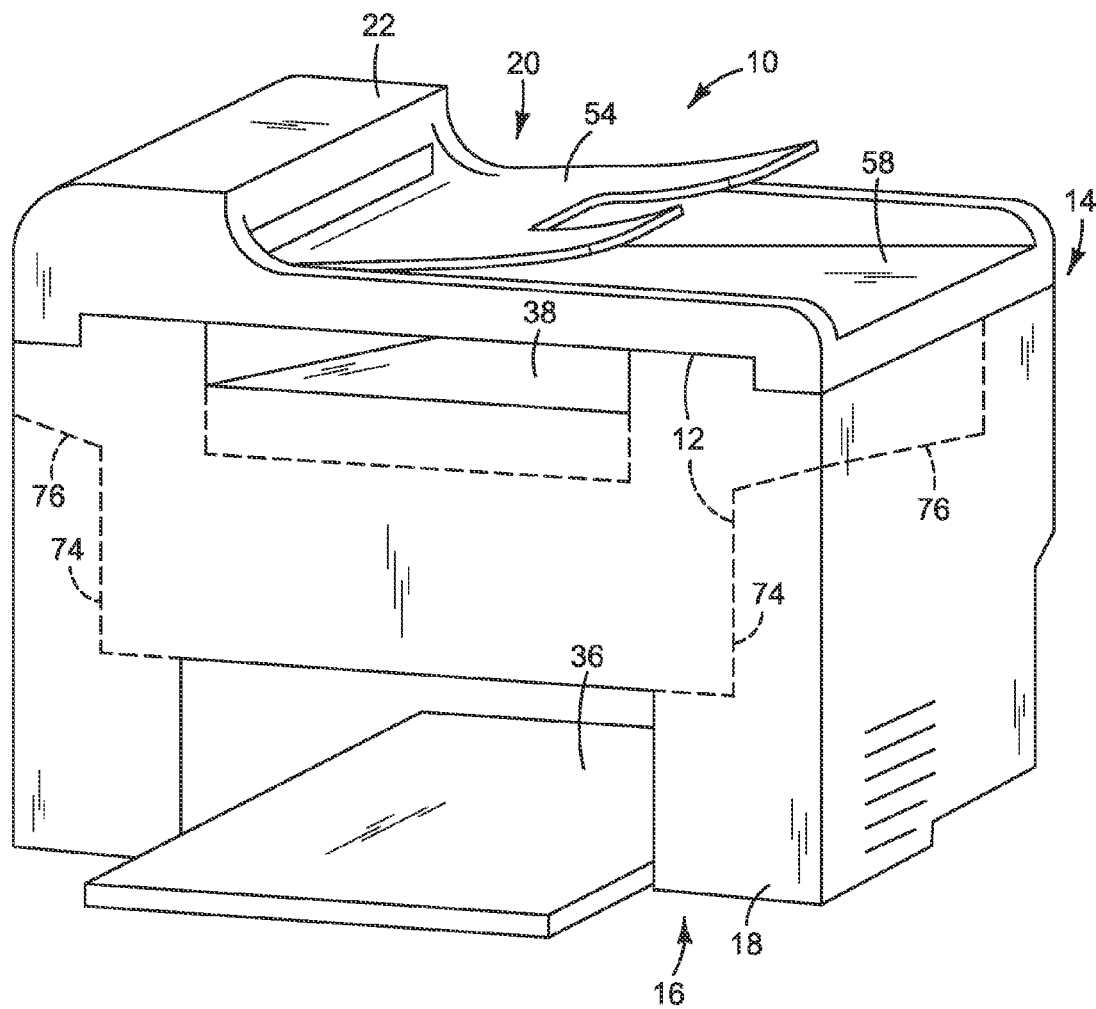
FIG. 1 is a perspective view illustrating a multifunction laser printing device implementing one example of a new toner container.
Figure 2:
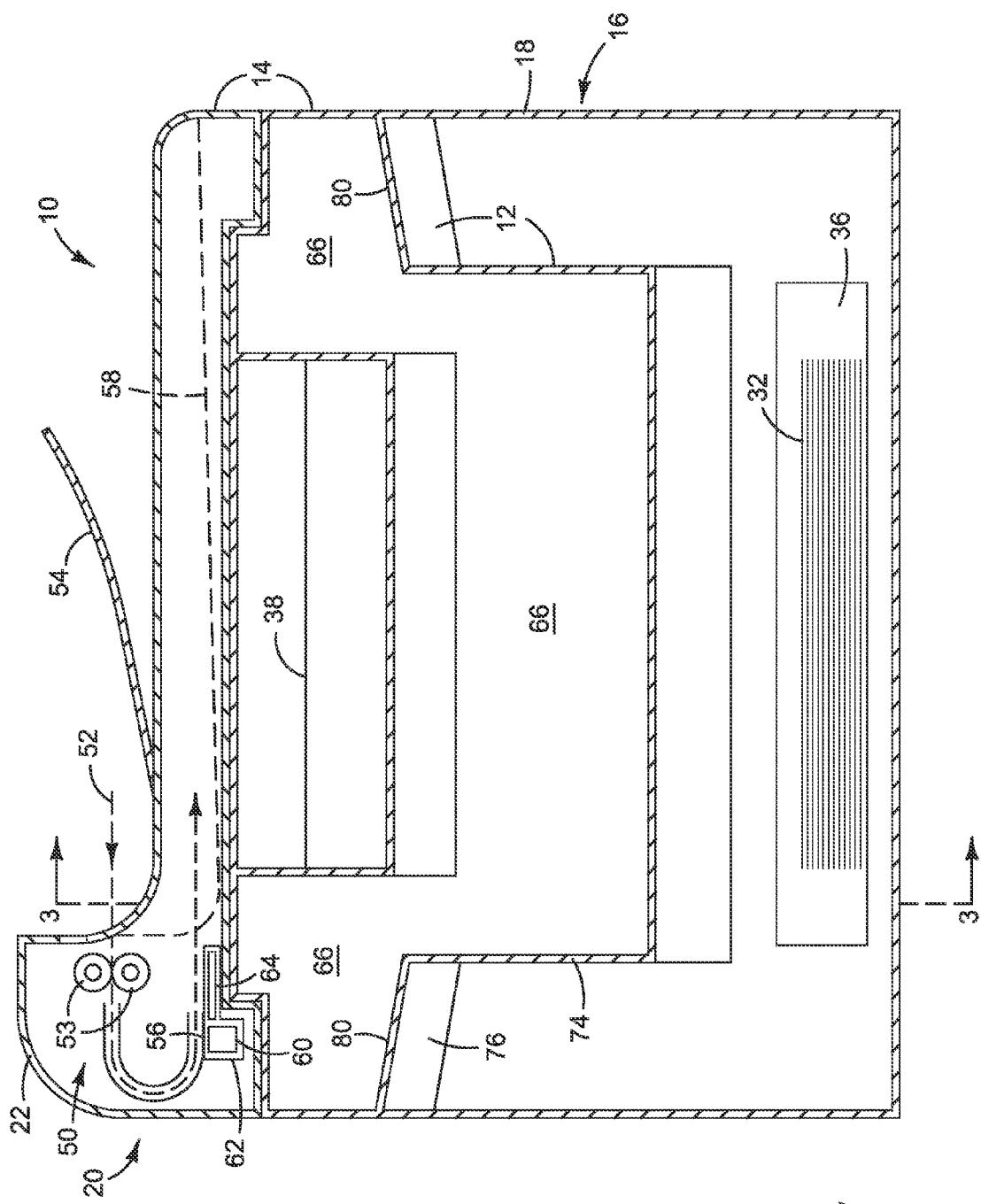
FIGS. 2 and 3 are front and side section views, respectively, showing the toner container and MFP (multifunction printing device) of FIG. 1.
Figure 3:
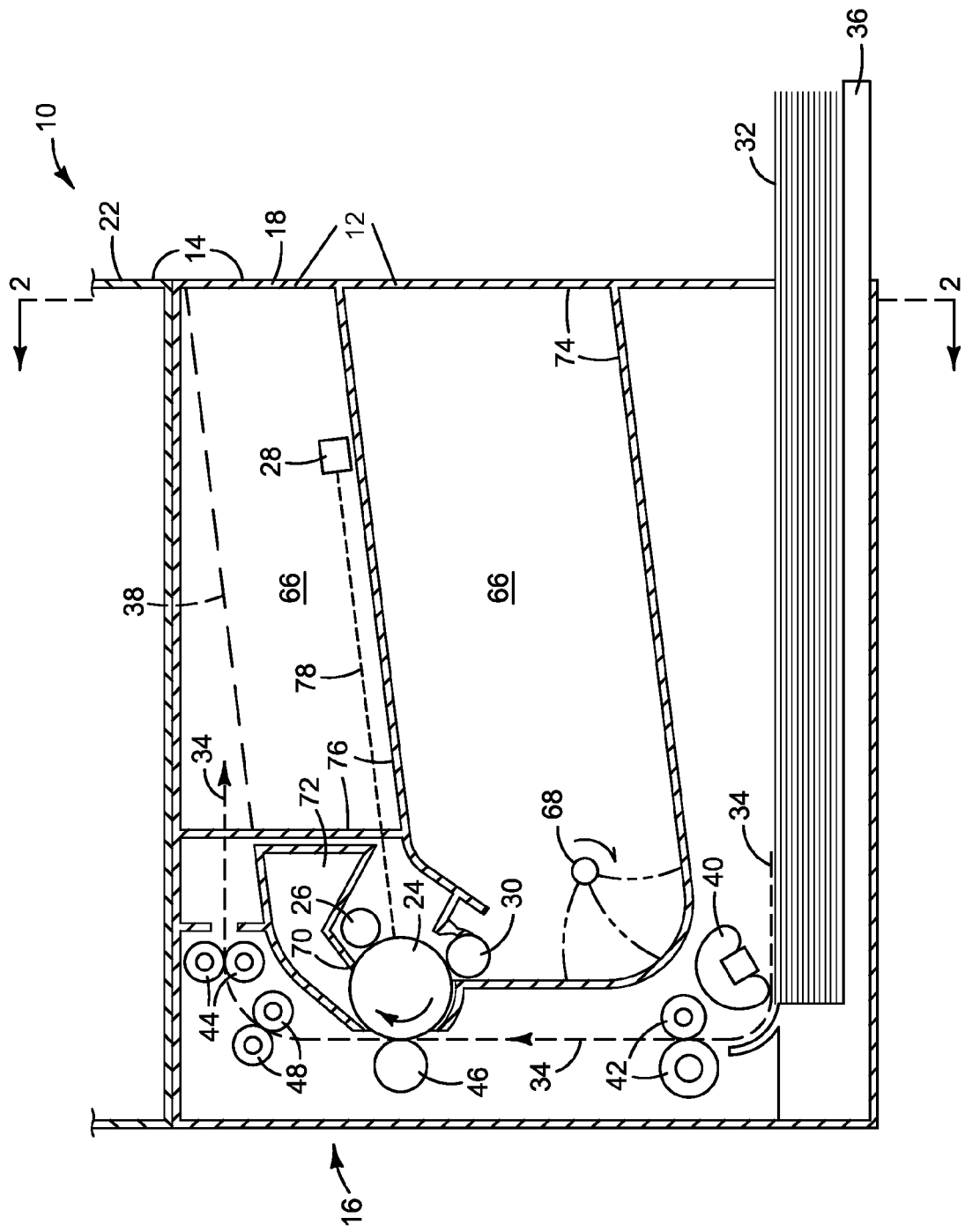
Figure 4:
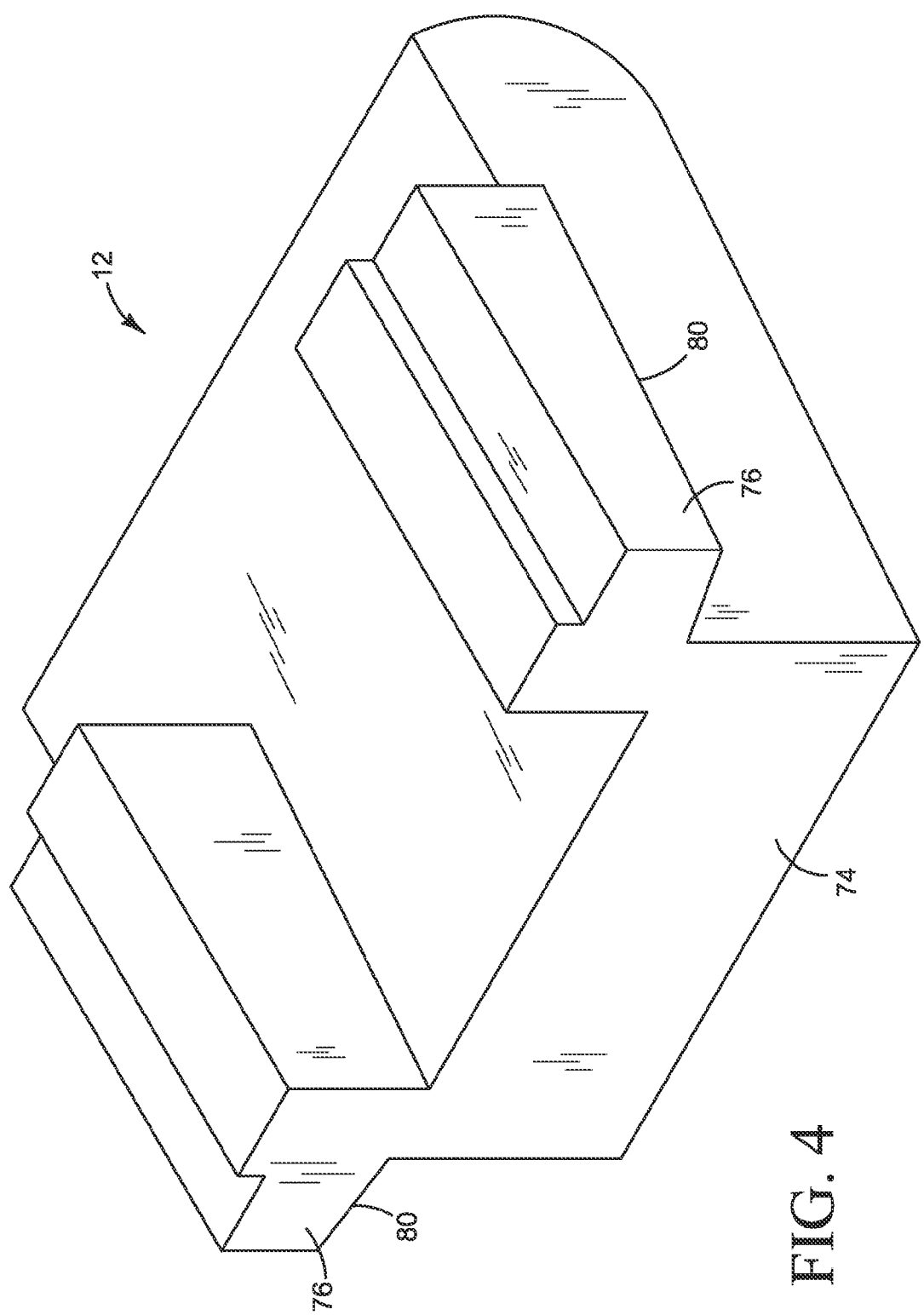
FIG. 4 is a detail perspective view of a toner container such as the one shown in the MFP of FIGS. 1-3.

FIG. 1 is a perspective view illustrating a multifunction laser printing device (MFP) 10 implementing one example of a new toner container 12. FIGS. 2 and 3 are front and side section views, respectively, showing toner container 12 and MFP 10 from FIG. 1. FIG. 4 is a detail perspective view of a toner container 12 such as the one shown in MFP 10 in FIGS. 1-3. Referring to FIGS. 1-4, MFP 10 includes a housing 14 that supports the operative components of MFP. Housing 14 represents generally load bearing and other supporting structures in MFP 10 as well as the exterior features of the MFP. A printer 16 is housed in a lower part 18 of MFP housing 14 and a scanner 20 is housed in an upper part 22 of MFP housing 18.

In a typical laser printer a uniform surface charge is applied to a photoconductor and then the photoconductor is exposed to a light that discharges the photoconductor in select areas to define a latent electrostatic image on the photoconductor. The latent image is developed by depositing toner on the surface of the photoconductor. The toner adheres to the imaged areas of the photoconductor to form a developed image that is transferred to paper or another print substrate. Thus, and referring specifically to FIG. 3, printer 16 includes a photoconductor roller 24 that has a photoconductive surface on which the latent image is formed and the toner image is developed, a charging roller 26 for applying a uniform surface charge to photoconductor 24, a laser or other suitable light source 28 for discharging photoconductor 24 in the desired pattern, and a developer roller 30 for applying toner to photoconductor 24. Although the photoconductive element 24, the charging device 26, and the developer unit 30 are shown as rollers, other suitable mechanisms or configurations for each component may be used. The configuration of printer 16 in FIG. 2 illustrates just one example configuration for the operative elements of an electro-photographic printer. Although the configuration of printer 16 in FIG. 3 represents a monochrome printer, examples of the new toner container might also be implemented in a color printer.

Referring again specifically to FIG. 3, a sheet of paper or other print substrate is picked from a stack 32 and fed along a substrate print path 34 from an input tray 36 to an output tray 38. Each sheet is picked from stack 32 and fed along print path 34 using, for example, a pick roller 40, feed rollers 42 and output rollers 44. Toner is applied to each sheet as it passes between photoconductor 24 and a transfer roller 46. For a dry toner electro-photographic printing process, the toner is affixed to the sheet as it passes through a nip between fusing rollers 48 which apply heat and pressure simultaneously to the print substrate.

Referring now specifically to FIG. 2, scanner 20 includes an automatic document feeder 50 through which sheets are moved along a U-shaped scan path 52, for example using feed rollers 53, from an input tray 54, over a transparent platen 56, to an output tray 58. A light bar or other suitable light source 60 in an imaging unit 62 illuminates the sheet as it passes over platen 62. The images reflected off the sheet are capture by a light sensor 64.

In the configuration shown in FIGS. 1-4, toner container 12 defines a generally U-shaped interior volume 66 from which fresh toner is supplied to developer roller 30. As shown in FIG. 3, a rotating paddle 68 may be used to sweep toner up to developer roller 30. Printer 16 may also include a cleaning blade 70 that scrapes residual toner off the rotating photoconductor 24 into a waste toner container 72. As best seen in FIGS. 2 and 4, the U-shaped interior volume 66 of toner container 12 is defined by an inboard, body part 74 of container 12 and a pair of outboard, tower parts 76 of container 12 at each side of body 74. In the example shown, each tower 76 is wing-shaped, extending up and out from body 74. As used herein, "tower" means part of the toner container is higher than the body. Thus, toner container 12 may be characterized as having interconnected lower and upper chambers 74 and 76. Lower chamber/body 74 lies below laser 28 and imaging light path 78 and extends from near photoconductor 24 at the rear of printer 16 forward to the front of printer 16. The floor 80 of each upper chamber/tower 76 slopes down (front to rear) and in (side to side) to help toner move from each upper chamber 76 to lower chamber 74.

The wings 76 of toner container 12 in the MFP 10 shown in FIGS. 1-3 occupy spaces that would remain largely unoccupied in a conventional MFP. Although examples of the new toner container might also be implemented in a single function printer, a toner container 12 such as that shown in the figures takes advantage of otherwise empty spaces created when printer and scanner housings are combined in a multifunction device, and thus the new toner container is particularly well suited for use in MFPs.

Figure 5:
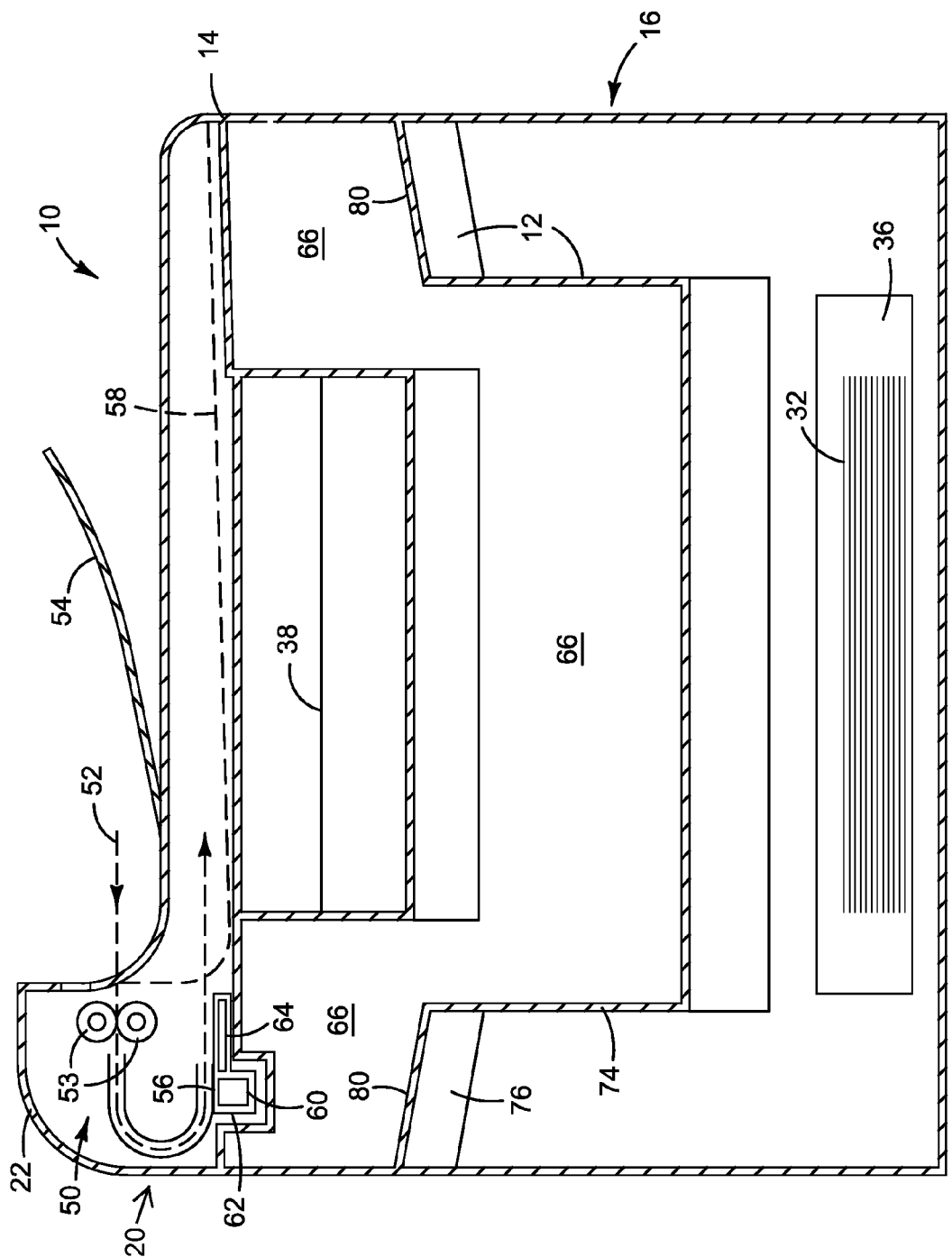
FIG. 5 is a front section view showing another example of the new toner container in an MFP.
Figure 6:
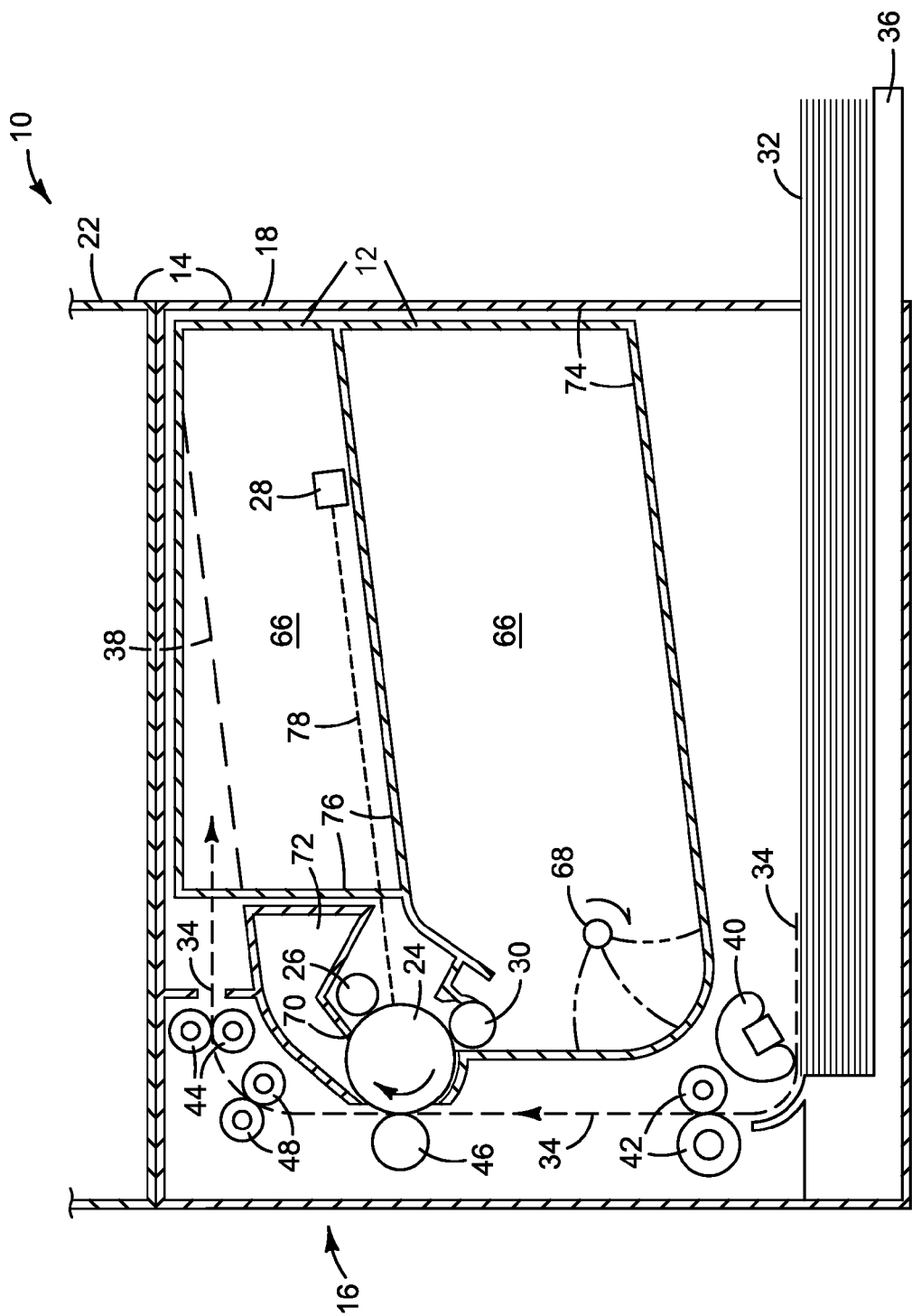
FIGS. 6 and 7 are side and front section views, respectively, showing another example of the new toner container in an MFP.
Figure 7:
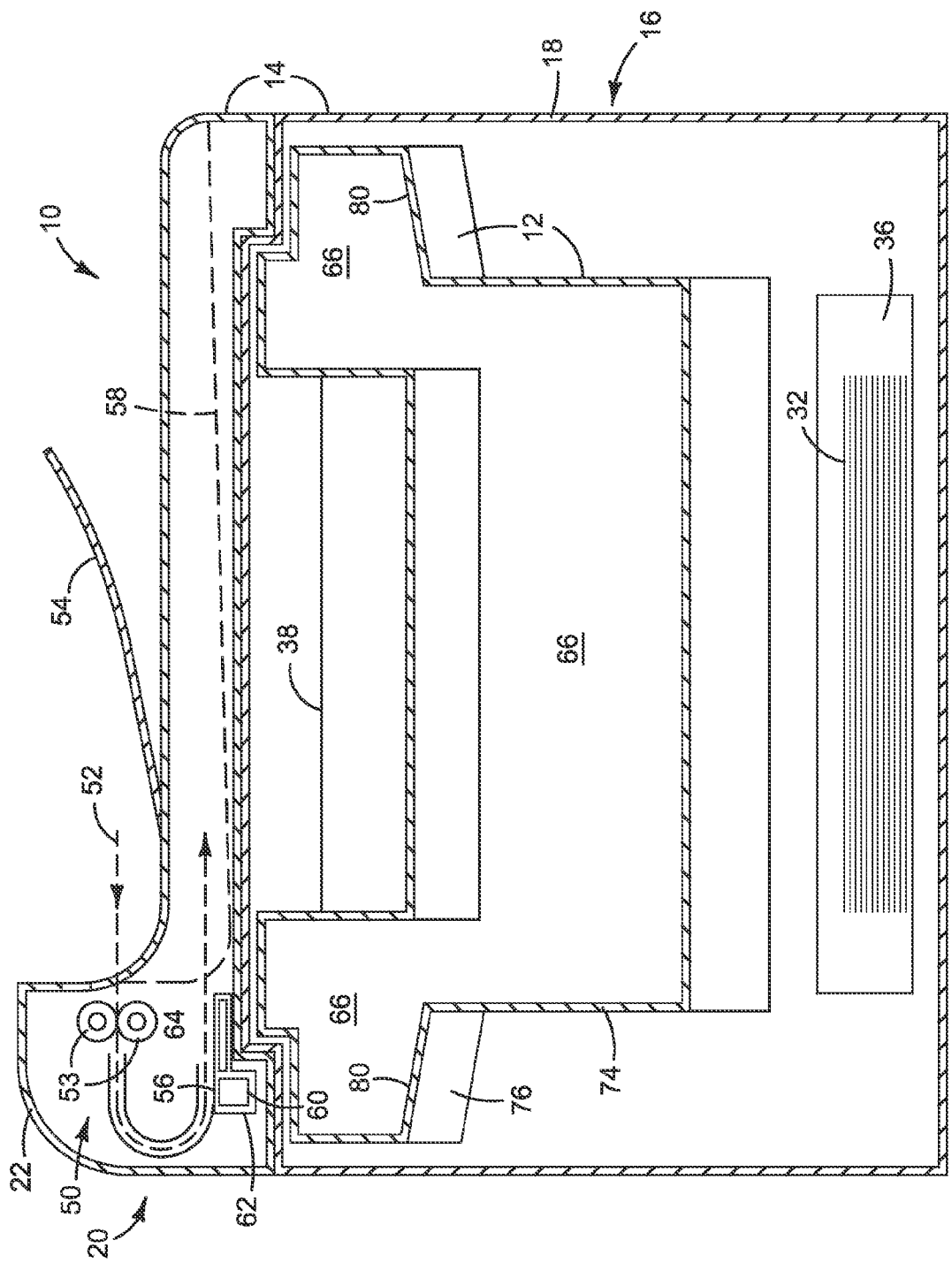

In the example shown FIGS. 2 and 3, toner container 12 is integrated into printer housing 18 as part of the load bearing structure and exterior of housing 18. In another example, shown in FIG. 5, each wing 76 extends up into the scanner space and forms part of a unitary MFP housing 14, as best seen by comparing the interface between printer 16 and scanner 20 in FIGS. 2 and 5. The example of FIG. 5 may be advantageous for some MFP devices to further expand the capacity of toner container 12 and/or where a unitary housing configuration is desired. In another example, shown in FIGS. 6 and 7, toner container 12 is configured as a discrete part inside printer housing 18. The example of FIGS. 6 and 7 may be desirable in some MFP devices, for example to facilitate manufacturing the toner container separately from the printer housing.

For lower print volume MFPs 10, an enlarged toner container 12 such as that shown in the figures can have sufficient capacity to store enough toner to print a minimum number of pages that corresponds to a predetermined expected useful life of the printer part of an MFP 10 (printer 16 in the figures). "Predetermined" in this context means a determination of expected useful life made before the printer is put into service, for example by the manufacturer as part of the specifications for the printer. In one example for a laser printer MFP designed for personal and small business use, the predetermined expected useful life of the printer may be about 30,000 printed pages. The configuration of toner container 12 in FIGS. 1-7 used in an MFP like that shown could easily store enough toner to print 30,000 pages, thus supplying toner for printing throughout the predetermined expected useful life of a printer 16 in MFP 10.

As noted at the beginning of this Description, the examples shown in the figures and described above illustrate but do not limit the invention. Other examples, embodiments and implementations are possible. Therefore, the foregoing description should not be construed to limit the scope of the invention, which is defined in the following claims.

What is claimed is:

1. A printing device, comprising:
   a housing;
   a photoconductor in the housing to apply toner to a print substrate;
   a developer in the housing to apply toner to the photoconductor;
   an output tray to support printed substrates; and
   a toner container in the housing to supply toner to the developer, the toner container having a first part below the output tray and a second part above the output tray, wherein the first part of the toner container comprises a body located wider the output tray and the second part of the toner container comprises a pair of wings extending up and out from the body, and wherein the wings are integrated into the housing as a non-removable load bearing structure.

2. The device of claim 1, wherein the output tray comprises a single output tray.

3. The device of claim 1, wherein the wings of the toner container are integrated into the housing as a non-removable exterior feature.

4. The device of claim 1, wherein:
   the photoconductor, developer, and output surface are located in a first part of the housing;
   the device further comprises a scanner in a second part of the housing over the first part of the housing; and
   the toner container is located wholly in the first part of the housing.

5. A multifunction printing device, comprising;
   a housing;
   a printer supported in a lower part of the housing;
   a scanner operatively connected to the printer, the scanner supported over the printer in an upper part of the housing;
   the printer including a photoconductor to apply toner to a print substrate, a developer to apply toner to the photoconductor, a light source to selective expose parts of the photoconductor to light, and a toner container to supply toner to the developer, the toner container having an interior volume defined by a body and a tower located above one side of the body, wherein the interior volume of the toner container comprises a U-shaped interior volume defined by the body of the toner container and a pair of towers located above opposite sides the body, and wherein the towers are integrated into the housing as a non-removable exterior feature.

6. The device of claim 5, wherein each of the towers is integrated into the housing as a non-removable load bearing structure supporting the scanner.

7. The device of claim 5, wherein the interior volume of the toner container has a capacity sufficient to store enough toner to print a minimum number of pages that corresponds to a predetermined expected useful life of the printer.

* * * * *